United States Patent
McRae (10) Patent No.: US 9,167,300 B2
(45) Date of Patent: Oct. 20, 2015

(54) MUTING NOTIFICATION SYSTEM

(71) Applicant: Matthew McRae, Irvine, CA (US)

(72) Inventor: Matthew McRae, Irvine, CA (US)

(73) Assignee: Vizio Inc., Irvine, CA (US)

( * ) Notice: Subject to any disclaimer, the term of this patent is extended or adjusted under 35 U.S.C. 154(b) by 43 days.

(21) Appl. No.: 14/061,851

(22) Filed: Oct. 24, 2013

(65) Prior Publication Data

US 2015/0121412 A1 Apr. 30, 2015

(51) Int. Cl.
*H04N 5/44* (2011.01)
*H04N 21/454* (2011.01)
*H04N 21/422* (2011.01)
*H04N 21/81* (2011.01)
*H04N 21/435* (2011.01)
*G08C 23/04* (2006.01)

(52) U.S. Cl.
CPC .............. *H04N 21/454* (2013.01); *G08C 23/04* (2013.01); *H04N 5/4403* (2013.01); *H04N 21/42204* (2013.01); *H04N 21/435* (2013.01); *H04N 21/812* (2013.01); *H04N 21/8126* (2013.01); *H04N 2005/4412* (2013.01); *H04N 2005/4426* (2013.01)

(58) Field of Classification Search
None
See application file for complete search history.

(56) References Cited

U.S. PATENT DOCUMENTS

| 6,631,363 | B1 | 10/2003 | Brown et al. | |
|---|---|---|---|---|
| 7,873,646 | B2 | 1/2011 | Yach et al. | |
| 8,311,513 | B1 | 11/2012 | Nasserbakht et al. | |
| 8,336,071 | B2 | 12/2012 | Ward, III et al. | |
| 2003/0070182 | A1* | 4/2003 | Pierre et al. | 725/135 |
| 2009/0022291 | A1* | 1/2009 | Cassanova | 379/88.17 |
| 2013/0007665 | A1 | 1/2013 | Chaudhri et al. | |
| 2014/0018049 | A1* | 1/2014 | Cannon et al. | 455/414.1 |
| 2014/0033255 | A1* | 1/2014 | Daly et al. | 725/37 |
| 2014/0123183 | A1* | 5/2014 | Fujimoto et al. | 725/37 |
| 2014/0214983 | A1* | 7/2014 | Hossack | 709/206 |

FOREIGN PATENT DOCUMENTS

WO WO2008015033 2/2008

* cited by examiner

*Primary Examiner* — Nathan Flynn
*Assistant Examiner* — Omar S Parra
(74) *Attorney, Agent, or Firm* — Law Office of Scott C. Harris, Inc.

(57) ABSTRACT

A television and remote control system, where the television receives data over a channel and produces outputs that create a television display. The television also receives notifications over a data connection indicating events that are other than the television display, like emails, alerts and the like. The television displays visual and audible notifications and mutes those notifications based on commands from a remote control.

30 Claims, 9 Drawing Sheets

Figure 14

MUTING NOTIFICATION SYSTEM

BACKGROUND

Viewers are bombarded with notifications they have no control over, on many connected devices they possess.

Most consumers with smart phones are used to receiving unsolicited notifications in the form of audible tones and icons that display at the top of their screen. Few of these notifications are important to the user because they fall into the category of application updates, weather alerts, advertising and other non-emergency type notifications. Personal computers, tablets and portable multimedia devices are also starting to receive alerts in the form of icons appearing on the screen and audible alerts.

Of all connected devices the television is probably the most immersive device owned by the average consumer and the device that offers the most escape from reality. Internet connected televisions and other connected consumer devices such as DVD players, connected internet radios and other multimedia devices such as gaming consoles can receive and display notification messages relating to numerous events. The list of possible events includes such things as application updates, messages or email received, preset alarms, electronic programming guide notices and numerous other alerts.

Television content has for some time had watermarked icons, messages and animations embedded into content broadcasted over the airwaves, cable television and satellite delivered content. These can be very annoying, especially if the content is "paid for on demand" or through a paid subscription service.

SUMMARY

The present invention is intended to preserve the view experience and to allow the user to become immersed in the content.

Watching a television program, users tend to "get into the moment" and are easily pulled out of that "moment" which can ruin the viewer experience. Viewers are continually blasted with notifications embedded into the content they watch such as water marks, barking banners and commercials all of which are inserted into the video by the broadcaster. Coupled with those distractions, connected televisions have the capability to receive additional notifications. These notifications can be received over an internet source or from other devices connected to the same wireless or wired router and displayed to the viewer real-time causing further distractions to what the user is viewing and often while viewing a piece of content that was paid for with a subscription or paid for on demand.

What is needed is some way to hold off or mute notifications received by a connected television or set top box that is connected so as to minimize the number of distractions displayed to the user while content is being played.

In a preferred embodiment, the user may press any button on a hand held remote control device for the television for a period of time defined as a long touch and the notification system will mute all notifications until another long touch button press is detected. Between the first and second long touch button depressions, no notifications will be displayed or audibly played.

In another slightly different embodiment, double clicking the audio mute button produces a notification mute. The user can cancel the notification mute by repeating the double click of the audio mute and notifications will then be unmuted.

In another slightly different embodiment, the remote has a separate button for notification mute. If the viewer wishes to mute notifications she needs only to press the notifications mute button. If the user wishes to cancel the notifications mute she needs only to repeat the single press of the notifications mute button and notifications will then be unmuted.

In another preferred embodiment, the user may categorize types of notifications and indicate which notifications are always announced, such as emergency broadcast notifications, and which notifications are never announced but maintained in a queue where the viewer may review then at their leisure (Twitter, Facebook, reminders etc).

In another embodiment, the user has the option of muting both audible notifications and visual notifications or allowing either of the notification types to be displayed or played. This allows the notification system to display a visual notification, normally in the form of an icon but not to play a tone or other audible notification.

In another embodiment, the user has the option of muting notifications based on time of day. The user may not have a problem allowing notifications during the morning through mid-afternoon but can mute them for evening programs, for example.

In another embodiment, the user may mute notifications based on genre of content being viewed. For example, the user may allow notifications during news programs but not during dramatic or mystery programs.

In another embodiment, the user may mute notifications based on type of content. For example the user may allow notifications to be presented on TV shows but not on Movies.

In another embodiment, the user may select, under notification actions, "Suppress During Programs" which has two states. During state one, when the user selects On, the notification system suppresses all notifications while a TV program is being viewed. When the user selects Off, the notification system reverts back to previously allowed notifications to be display if other action parameters permit the notifications to be displayed.

In a slightly different version of this embodiment, the suppress One option will allow notifications to be displayed or announced audibly during commercials but not during the viewing of actual content.

In another embodiment the system will mute notification until the user "pauses" the content or changes channels.

In another embodiment, the user may control notifications based on the input source. For example, video content can be received over the air through a tuner, received via a satellite or cable set top box, received via a wired or wireless internet connection or received from a locally connected DVD player, game console (which itself may connected to the internet) or from local storage devices such as network connected storage or storage on computers accessible through a local area network. For content being played from storage devices (DVD players and connected storage) the viewer may want some notifications that normally are not announced from these sources to be displayed. These may include emergency broadcast messages or text messages from certain sources such as family members. In this embodiment, the user may select specific notifications, types of notifications or categories of notification she wishes to see or hear regardless of the source of the programming the user is currently watching.

BRIEF DESCRIPTION OF THE DRAWINGS in the drawings.

DETAILED DESCRIPTION

Notifications sent to televisions, like notifications sent to cell phones, tablet computers, desktop and laptop computers, game consoles, multiple media players and other devices are generally sent as digital packets of information.

These packets contain headers and data. The headers generally identify the sender and contain information about the notification. The data portion of notifications contains the message to be displayed to the user and may contain information relating to an audio component of the notification.

Figure 1:
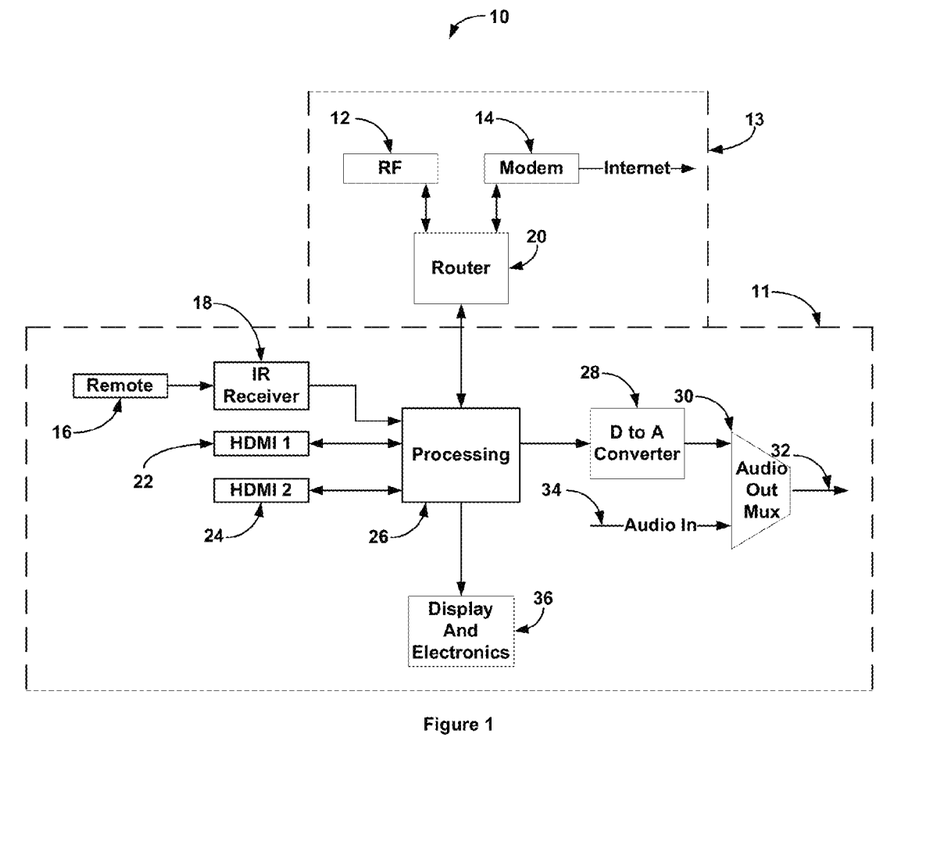
FIG. 1 is a depiction of the functional components in a television capable of processing alerts.

Now referencing FIG. 1 where 10 is a schematic depiction of the functional components of a television and communications components with the capability to display or play notifications received from sources outside of the television. In this depiction, processor 26 may be a System On a Chip (SOC) or may be a single processor. Modern televisions typically contain multiple processors. Some or all of these multiple processors may reside in a single chip package. Generally one of the processors in a SOC will be the master processor that controls the other processors. Processor 26 communicates with devices outside of itself through both wired and wireless means. Processor 26 can send and receive data to and from router 20 which has a wireless component 12 and a connection to modem 14. Modem 14 may be connected to the internet through any number of means such as a television cable or a DSL line. The television depicted as 10 has two HDMI inputs that allow devices such as set top boxes to provide video and audio content or Blu-ray players, game consoles, and/or other devices that can communicate over HDMI ports. HDMI ports are bidirectional which means that television 10 can send commands to and receive data from the devices attached to the HDMI cable. More generally, however, the television system 10 receives data over some channel (e.g., broadcast or cable or satellite or internet), and produces outputs that create a television display, e.g. of video or the like.

Processor 26 accommodates user input through at least an Infra Red (IR) port. In this depiction processor 26 receives commands from IR receiver 18 which receives and decodes IR pulses sent by remote 16. The user typically sends such commands as channel change commands and user interface controls such as directional arrow (Up, Down, Left and Right) commands and select/OK commands.

Processor 26 processes video received from the HDMI 1 and HDMI 2 ports, tuner output and multimedia data received via the internet connection. This data is processed and sent to display and electronics 36 where the data is used to drive the display component of display and electronics 36.

Processor 26 will also decode audio components of multimedia data and send digitized audio packets to D to A converter 28 which in turns sends analog audio data Audio Out Mux 30. Audio out mux 30 can also receive analog audio through audio in port 34. Audio out mux will pass one of the two input analog audio to output 32.

Figure 2:
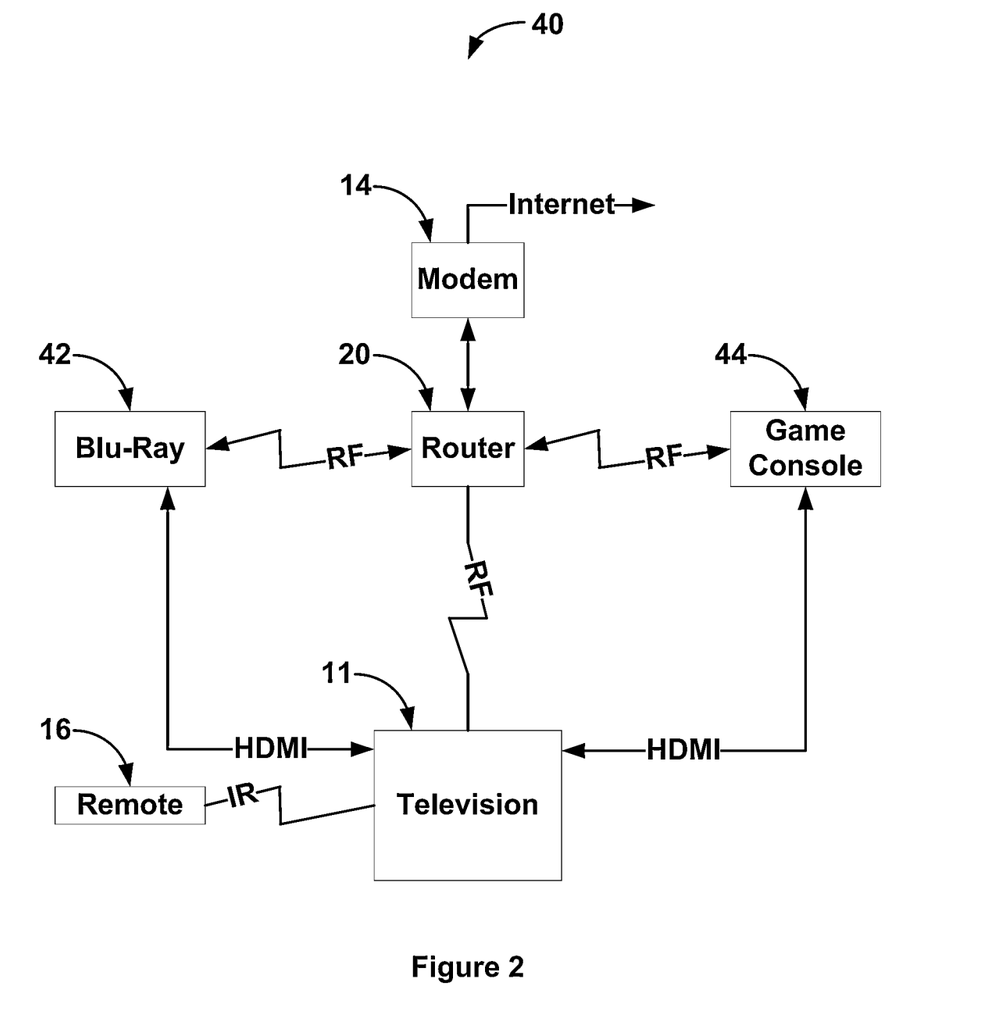
FIG. 2 is a depiction of a television and other standalone systems capable of sending alerts or notifications to the television.

Now referencing FIG. 2 where 40 depicts a schematic diagram that shows how television 11 interfaces with other components and systems that provide multimedia content and data to television 11. In this depiction, television 11 has three basic inputs. Remote 16 provides user commands to television 11 through an IR port. Router 20 receives and sends data in the form of multiple media content and alerts or notifications from Blu-ray player 42 over a RF link. Router 20 also receives and sends data in the form of multiple media content and alerts or notifications from game console 44 over a RF link. Lastly, router 20 receives and sends digital data to and from modem 14 which in turn is connected to an internet service provider. Router 20 in turn sends all of this digital data to television 11 and receives from television 11 digital data that in turn gets passed back to modem 14, to Blu-ray player 42 via its wireless interface and to game console 44 via its wireless interface. HDMI ports may also be connected to both Blu-ray player 42 and game console 44. Notifications may be sent to television 11 over any of the wired or wireless ports.

Figure 3:
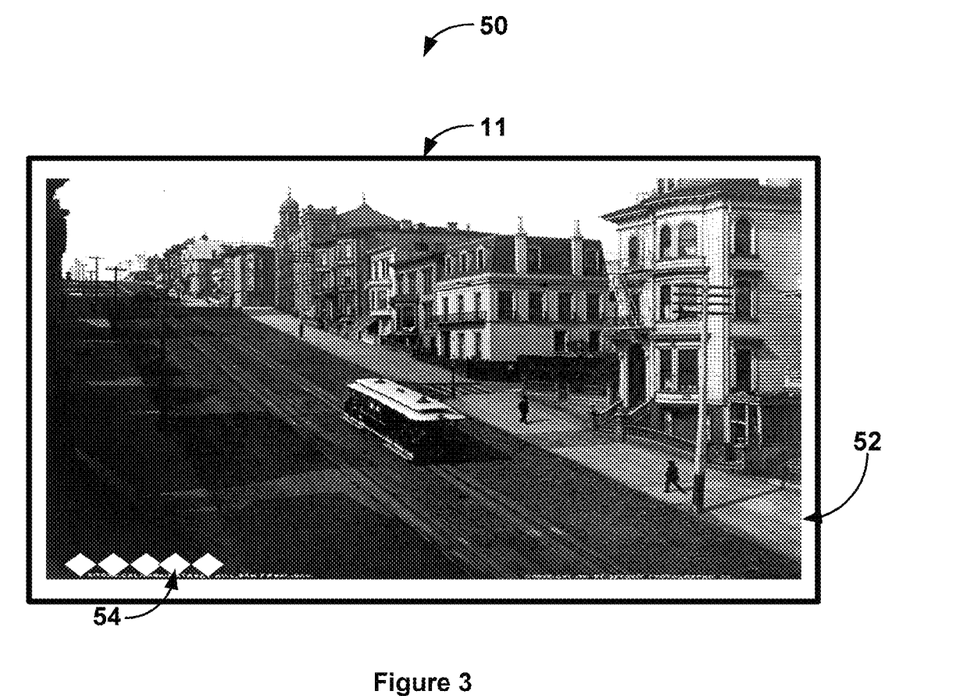
FIG. 3 is a depiction of a television playing a media content with notifications appearing at the bottom left of the display screen.

Now referencing FIG. 3 where 50 depicts television 11. Television 11, in this depiction, is showing content where a street scene of San Francisco is displayed as 52. Note that the lower left corner of the display screen shows five diamonds which in this depiction are visual notifications 54. The size of the diamonds may be larger or smaller than what is shown or they may appear as different shaped icons that are different colors. The inventor believes that these visual notifications degrade the viewing experience of the content that is being displayed.

Note also that audio notifications are possible. Anyone with a cell phone is familiar with audio notifications played through speakers on the cell phone when a text message is received or when some other event is announced. When audio notifications are announced on a television, the mood of the content being played can be completely ruined.

Figure 4:
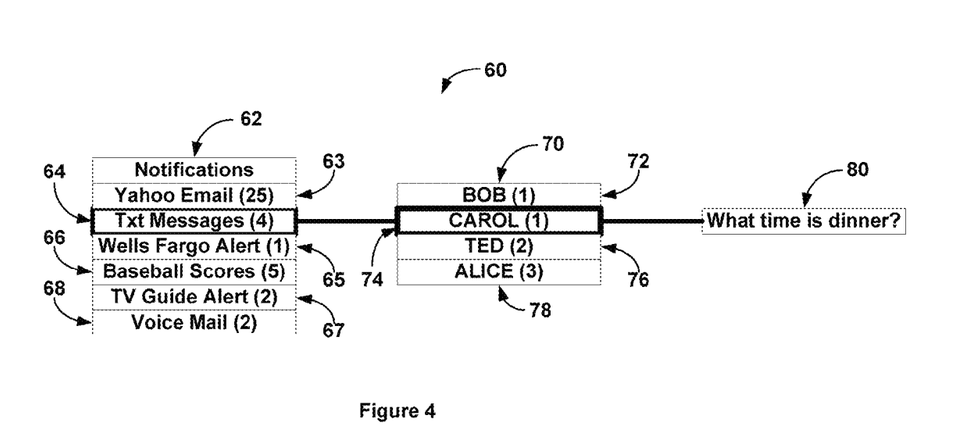
FIG. 4 is a depiction of a text message notification.

Now referencing FIG. 4 where the user has launched the notification display. In this depiction 60 depicts the notifications after the user has pressed the "notifications" button on the remote 16 or has selected notifications through one of the system menus not shown. In the current depiction, notifications 62 includes 6 different notifications; here yahoo email 63 with 25 emails waiting to be read, txt messages 64 with 4 text messages waiting to be read, Wells Fargo alert 65 with 1 alert waiting to be read, baseball scores 66 with scores for 5 games waiting to be read, TV Guide alert 67 with 2 programming alerts waiting to be read and voice mail 68 with 2 voice mails waiting to be heard.

In this depiction the user has, using remote 16, brought txt messages 64 into focus. Focus is shown in this depiction by txt messages 64 having a thicker border than any of the other notifications. When the user brought txt messages 64 into focus that txt message sender list 70 was presented. This list shows that four people have sent txt messages. These are Bob 72 with 1 message pending, Carol 74 with 1 message pending, Ted 76 with 2 messages pending and Alice 78 with 3 messages pending. The user, in this depiction, has brought Carol 74 into focus and the txt message sent by Carol 74 is display. Carol's message 80 is asking for the time that dinner will be ready. Additionally, txt messages 64 also contains two social media providers, which in the present case are, Facebook 77 with 1 txt message pending and Twitter 79 with 50 tweets pending.

Figure 5:
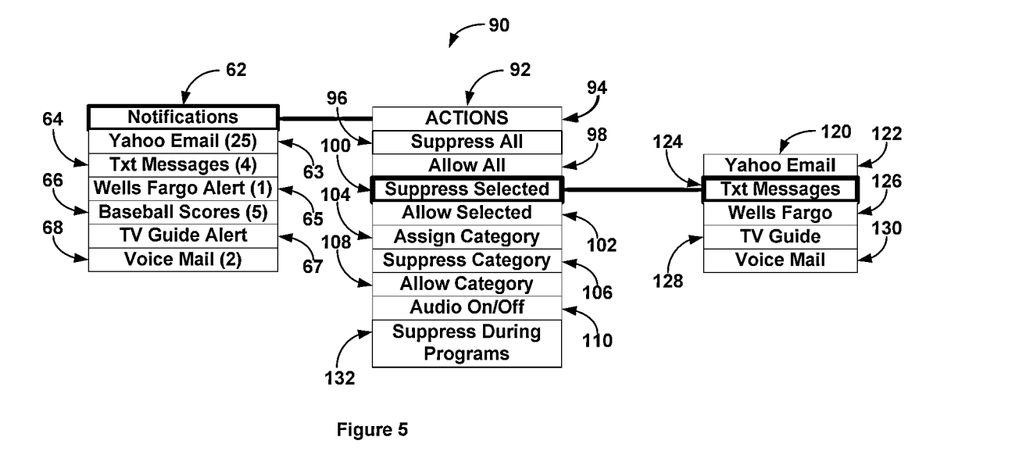
FIG. 5 is a depiction of the user suppressing text messages.

Now referencing FIG. 5 where 90 depicts actions 92 that the user may take in regards to managing their notifications. In this depiction, the user has brought notifications 62 into focus. This resulted in actions list 92 being displayed. This list allows the user to suppress all of the notifications such that no notification diamonds will be displayed on the television screen at 96. If the user had previously selected suppressed all at 96, the user may now want to allow all 98 notifications; and bringing that choice into focus all of the pending notifications will be displayed as diamonds on the television screen. If the user selects suppress selected notifications at 100, the list of notifications senders 120 will be displayed. This list contains all of the entities that can send notifications to television 11. This example list shows that Yahoo Email 122, Txt messages 124, Wells Fargo 126, TV Guide 128 and voice mail 130 can all initiate and send notifications to television 11. In the current depiction, the user has brought txt messages 124 into focus which will cause that notification to be suppressed and not displayed. At this point the user can exit the list of notifications senders 120 and return to normal programming on television 11 or can select another notification sender for suppression.

Figure 6:
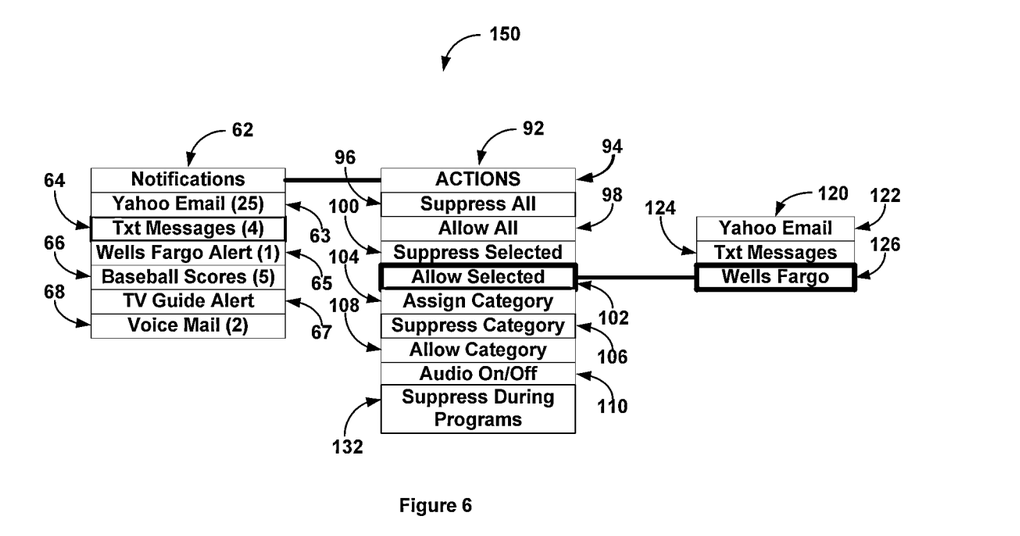
FIG. 6 is a depiction of the user allowing text messages after they had been suppressed.

Now referencing FIG. 6 where 150 depicts the user deciding to bring allow selected 102 into focus. This option operates much the same as suppress selected 100. The current option allows the user to select a previously suppressed sender of notifications to be allowed which in this depiction is Wells Fargo 126. Also note that in this depiction, the list of suppressed senders 120 only contained 3 formerly selected senders that were suppressed.

Figure 7:
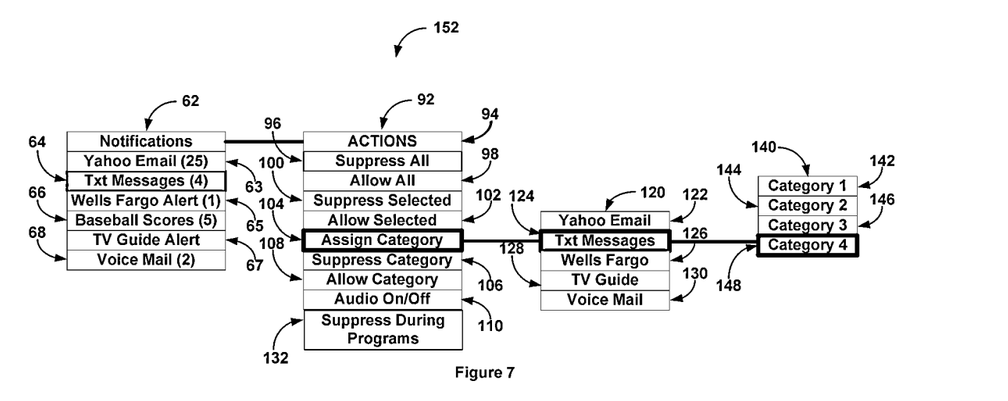
FIG. 7 is a depiction of the user assigning text messages to a category.

The notification system allows the user to assign any notification sender on the list of notification senders 120 to be assigned to any category of notifications. In FIG. 7, 152 depicts this action. In the current depiction, the user has brought assign category 104 into focus. The notification system has displayed the list of notification senders 120 and the list of categories 140. In the current depiction, the user has brought txt messages 124 into focus and category 4 into focus. These actions will cause txt messages 124 to be assigned to category 4. The user can assign multiple notification senders 120 to one or more categories. This allows the user to allow and suppress a category which gives the user the power to allow or suppress multiple notification senders 120 at one time.

Figure 8:
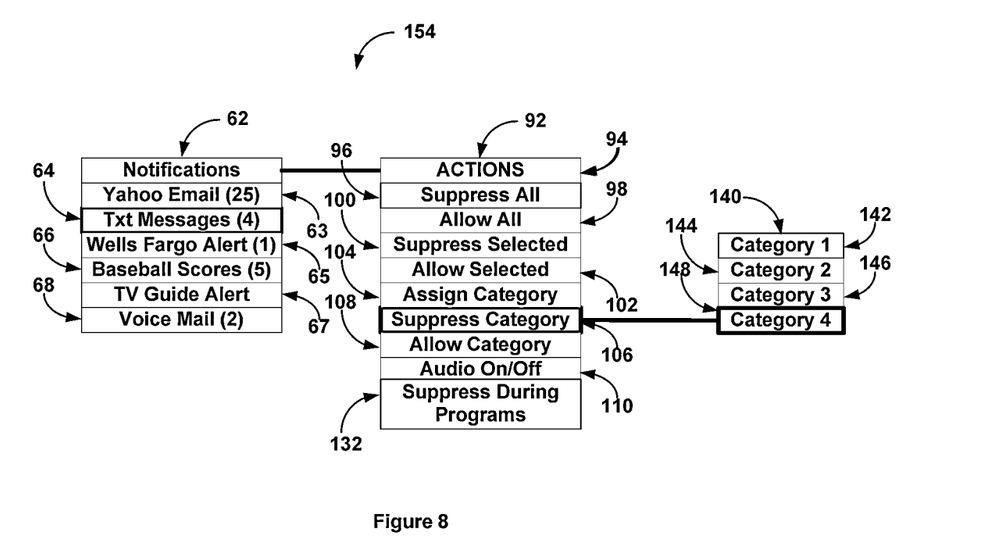
FIG. 8 is a depiction of the user suppressing a category of notifications.

Now referencing FIG. 8 where 154 depicts the user suppressing a category. In this depiction the user has brought suppress category 106 into focus resulting in category list 140 being displayed. The user then brought category 4 148 into focus resulting in the system suppressing any notification sender from notification sender list 120 being suppressed after the user clicks OK or Select on her remote 16 after which the display will be cleared.

Figure 9:
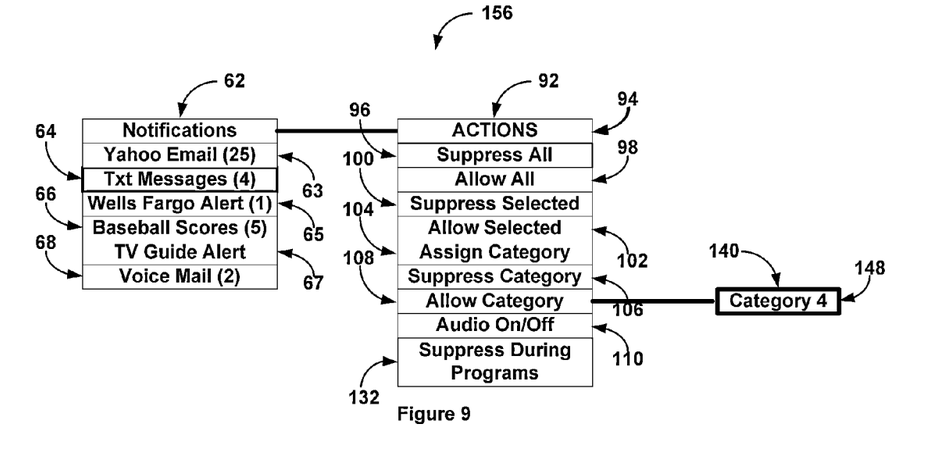
FIG. 9 is a depiction of the user allowing a category of notifications.

Now referencing FIG. 9 where 156 depicts the user allowing a category that had previously been suppressed. In this depiction only category 4 148 had been suppressed (shown in FIG. 8). Once the user brings category 4 into focus and the user presses OK or select, those notification senders previously assigned to category 4 148 will be allowed to post notifications and the display will be cleared.

Figure 10:
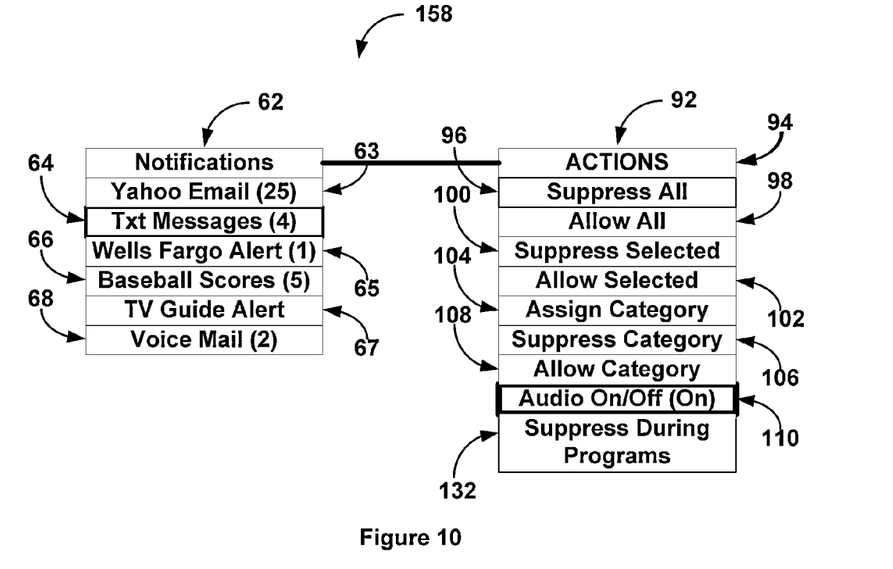
FIG. 10 is a depiction of the user toggling the notification audio on or off.

Now referencing FIG. 10 where 158 depicts notification action audio on/off being toggled. In this depiction, the user has selected from Actions 92 the toggle for audio on/off 110 which is shown as being in focus. Note that audio on/off 110 shows the current state as (ON). After audio on/off 110 is in focus and the user presses OK or select, the display will be removed and the current state for audio notifications will then be (OFF).

Figure 11:
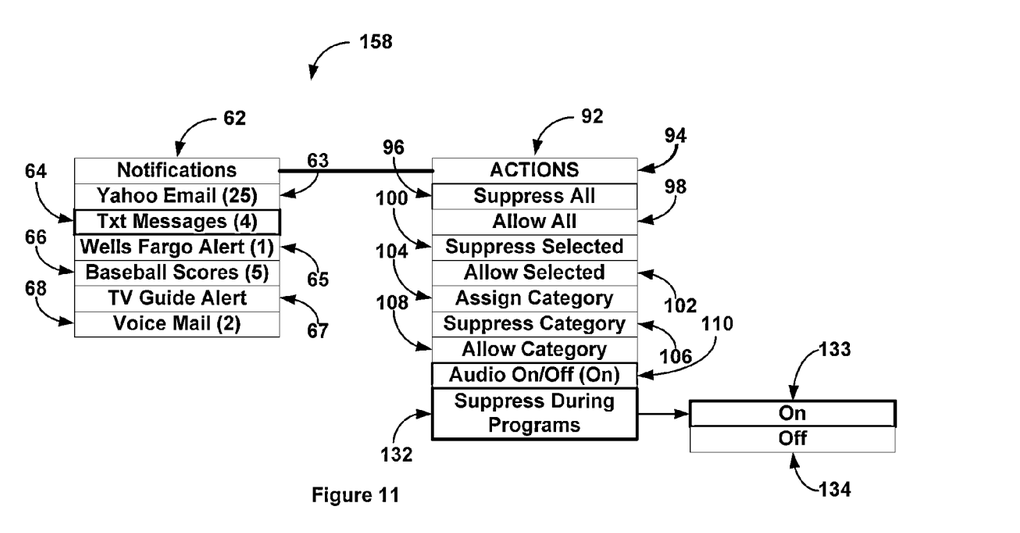
FIG. 11 is a depiction of the user setting a notification action of Suppressing notification while a program is being viewed.
Figure 12:
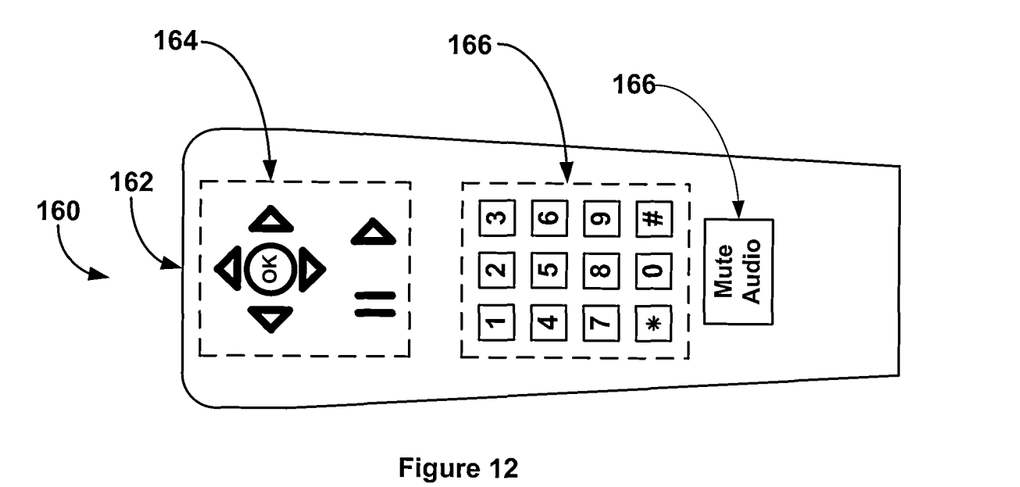
FIG. 12 is a depiction of a hand held remote control device where buttons for common purpose are identified in groups and an Audio Mute button is shown.

Now referencing FIG. 11 and FIG. 12 where 159 depicts notification actions 92 showing Suppress During Programs 132 in focus. Suppress During Programs 132 has two states. These are Suppress ON 133 and Suppress OFF 134. When the user selects Suppress ON 133 all notifications will be muted until the user selects Suppress OFF 134.

In a slightly different embodiment, the user may suppress all notifications with a single long touch depression of any button on the keyboard except the enter/OK button. When the user performs a long press on a key, the notification will suppress all notifications until a second long press on any key except the enter/OK button. When the second long touch is performed by the user the mute notification system will revert to the state prior to the first long touch button depression was performed.

Figure 13:
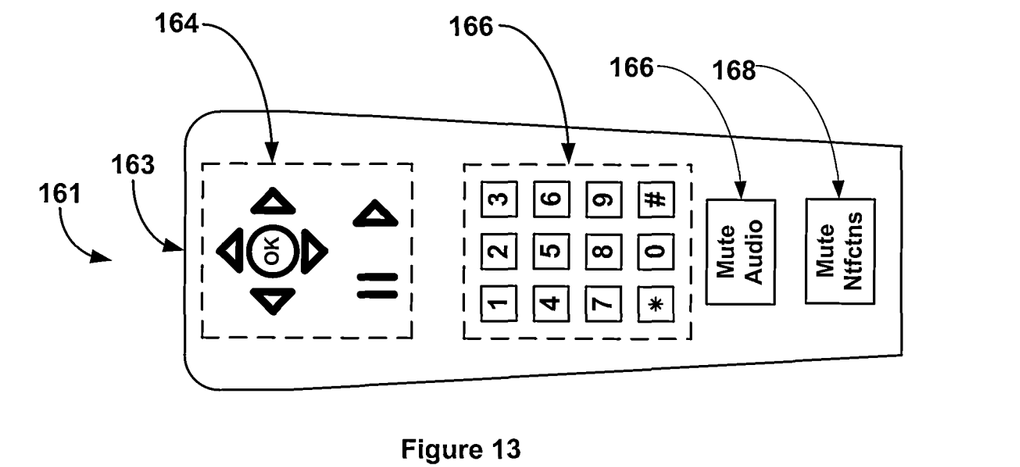
FIG. 13 is a depiction of a hand held remote control device where buttons for common purpose are identified in groups and an Audio Mute button and a Notifications Mute button is shown.

Now referencing FIGS. 12 and 13 where 160 depicts a typical hand held remote control device that can communicate with television 11 as depicted in FIG. 2. Remote control device 162 depicts the 12 buttons normally found on remote control devices as number 166 and directional navigation and trick play buttons as 164. Long button touches or presses can be made on any button on remote control device 162 except for Enter/OK button located in directional navigation and trick play buttons 164. FIG. 12 also shows remote control 162 having a mute audio button 166. In this depiction, the user can use the mute audio button 166 to mute all notifications by pressing mute audio button 166 twice in the manner of double clicking a button. Once the notification are muted the user may un-mute the notifications by double pressing mute audio button 166.

FIG. 13 depicts a similar remote control device 163 as having a mute notifications button 168. In the depiction, the user can use the mute notifications button 166 to mute all notifications by pressing mute notifications button 168 once. After the notification are muted, the user may un-mute the notifications by pressing mute notifications button 168 once.

Figure 14:
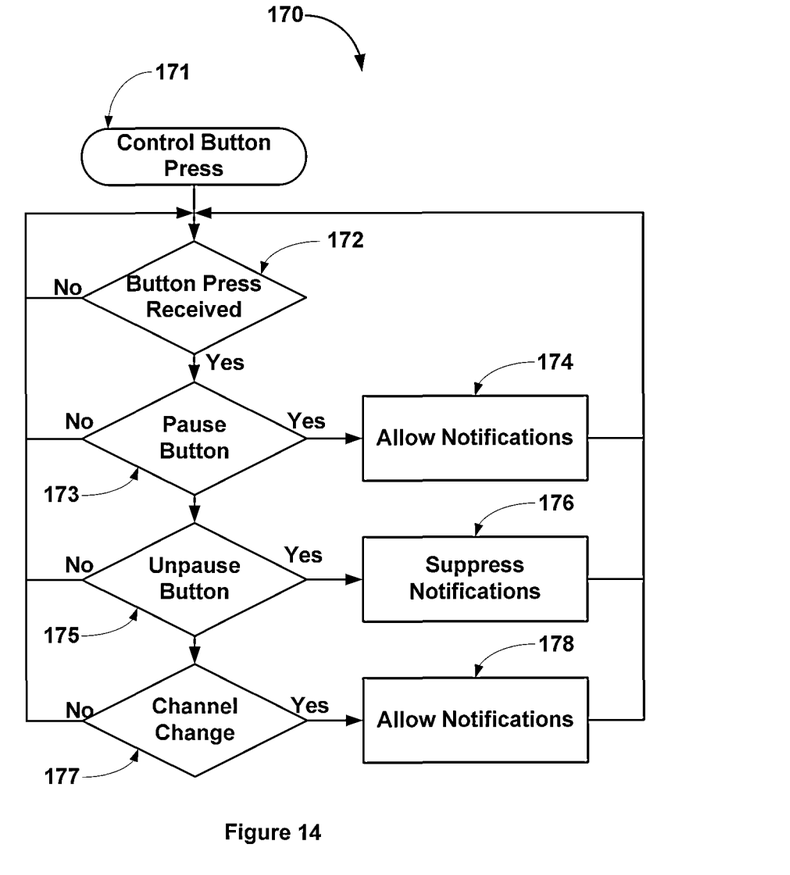
FIG. 14 is a depiction of a logic flow chart showing control button processing enabling and disabling notifications.

Now referencing FIG. 14 where 170 depicts a logic flow chart showing how control buttons such as pause and change channel effect notifications that are currently active. Entry to the flow chart is at control button press 171 which falls through to decision block button press received 172. If a control button has not been pressed decision block 172 will exit at "no" and return control to the entry of decision block 172. This loop is a classic polling loop. Mechanisms other than control loops may be used such as an entry to decision block 172 when a button press interrupt has been generated by the operating system.

If a button press has been received, decision block 172 will drop control through to decision block pause button 173. If a pause button had been pressed by the user, pause button decision block 173 will exit to processing block allow notifications 174. Processing block allow notifications 174 will notify the notification system to enable notifications after which processing block allow notifications 174 will exit to the top of decision block button press received 172. If the current button press was not a pause button, decision block pause button 173 will exit and control will fall through to decision block unpause button 175.

Decision block unpause button 175 will, if the button press was unpause, exit to processing block suppress notifications 176. Processing block suppress notifications 176 will notify the notification system to suppress notifications afterwhich processing block suppress notifications 176 will exit to the top of decision block button press received 172. If the current button press was not a unpause button, decision block pause button 175 will exit and control will fall through to decision block change channel 177.

Decision block change channel button 177 will, if the button press was a change channel, exit to processing block allow notifications 178. Processing block allow notifications 178 will notify the notification system to allow notifications after which processing block allow notifications 178 will exit to the top of decision block button press received 172. If the current button press was not a unpause button, decision block pause button 177 will exit to the top of decision block button press received 172.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, the techniques described herein can be used with other kinds of remote controls and to suppress other kinds of information.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A television system, comprising:
a television device that receives data over a channel and produces outputs that create a television display,
said television device also receiving notifications over a data connection indicating events that are other than the television display,
said television device causing display of visual notifications and and outputting audible notifications based on said notifications received over the data connection; and
said television device receiving a command whereby said notifications do not display the visual notifications and do not output said audible notifications until said command is removed, however said television device continues to receive said notifications,
wherein said command comprises selecting at least a first of said different notification type to be suppressed and not selecting a second of said different notification types to be suppressed, each notification type having a different source, and said television device suppressing only selected ones of said notifications but displaying other notifications other than the at least the first notification type to be suppressed.

2. The system as in claim 1, wherein said television device is a television with an embedded screen.

3. The system as in claim 1, wherein said television device is a set top box.

4. The system as in claim 1, wherein said channel is one of broadcast or cable or satellite or Internet.

5. The system as in claim 1, wherein said notifications include all of messages from other people, and alerts from services that are not messages from other people.

6. The system as in claim 1, wherein said command comprises selecting at least one different notification type to be suppressed, each notification type having a different source, and said television device suppressing only selected ones of said notifications but displaying other notifications other than the at least one notification type to be suppressed.

7. The system as in claim 1, wherein said visual notifications include icons shown on the television display including one icon for each of the notification types, and only icons for notification types that not suppressed are shown on the television display, and icons for notification types to be suppressed are not shown on the television display.

8. The system as in claim 1, wherein said visual notifications include icons including one icon for each of a plurality of categories of messages which have been received.

9. The system as in claim 1, wherein said command is carried out by receiving a long press on a button on an infrared remote which controls the television device.

10. The system as in claim 1, where said command includes a first command which suppresses display of all notifications, a second command which suppresses display of only selected notifications; and a third command which suppresses display of at least one of a plurality of categories of said notifications.

11. The system as in claim 1, wherein said command is carried out by receiving a command from a dedicated button on an infrared remote.

12. A television system, comprising:
a television device that receives data over a channel and produces outputs that create a television display,
said television device also receiving notifications over a data connection indicating events other than the television display,
said television device causing display of visual notifications indicating information from said notifications, where said display includes at least one icon, and where each icon that is displayed represents a specific category of notifications that has been received; and
said television device receiving at least one command that prevents display of said visual notification,
where said at least one command includes a first command which suppresses display of all visual notifications, a second command which suppresses display of only selected notifications; and a third command which suppresses display of at least one of said categories of notifications, whereby said at least one command prevents displaying said visual notifications until said at least one command is terminated, and wherein said television device continues to receive said notifications after receiving said at least one command wherein said at least one command comprises selecting at least a first of said different notification type to be suppressed and not selecting a second of said different notification types to be suppressed, each notification type having a different source, and said television device suppressing only selected ones of said notifications but displaying other notifications other than the at least the first notification type to be suppressed.

13. The television system as in claim 12, wherein said at least one command includes also commands to allow certain kinds of notifications.

14. The television system as in claim 12, wherein said at least one command also includes commands to suppress notifications only during television programs and to allow said notifications during times when there are not television programs.

15. The television system as in claim 12, wherein said category of messages include email messages, text messages, alerts from institutions, and voicemails.

16. The television system as in claim 15, wherein said category of messages also include sports scores.

17. The system as in claim 12, wherein said television device is a television with an embedded screen.

18. The system as in claim 12, wherein said television device is a set top box.

19. The system as in claim 12, wherein said visual notifications include icons shown on the television display including one icon for each of the notification types, and only icons for notification types that not suppressed are shown on the television display, and icons for notification types to be suppressed are not shown on the television display.

20. The system as in claim 12, wherein one of said notifications is messages from other people, and said television device allows viewing said messages from other people.

21. The system as in claim 12, wherein said command is carried out by receiving a long press on a button on an infrared remote which controls a television device.

22. The system as in claim 12, wherein said command is received as a dedicated button from an infrared remote.

23. A remote control system for controlling a television system, comprising:

a remote control device that controls channels that are displayed on a television display;

said remote control device also having a function that outputs a command that controls preventing said television system from displaying visual notifications and audible notifications based on information that has been received over a data connection while still allowing said device to receive said notifications, and said remote control device also controlling removing said function to allow said device to display said visual notifications and audible notifications based on said notifications that are received, wherein said command comprises selecting at least a first of said different notification type to be suppressed and not selecting a second of said different notification types to be suppressed, each notification type having a different source, and said television device suppressing only selected ones of said notifications but displaying other notifications other than the at least the first notification type to be suppressed.

24. The system as in claim 23, wherein said remote control controls a television device which is a television with an embedded screen.

25. The system as in claim 23, wherein said remote control controls a television device which is a set top box.

26. The system as in claim 23, wherein said function prevents said television system from displaying only selected ones of said notifications based on a source of said notifications.

27. The system as in claim 23, wherein said remote control controls said television system to allow viewing messages from other people.

28. The system as in claim 23, wherein said function is carried out by actuating a long press on a button on an infrared remote which controls a television device.

29. The system as in claim 23, where said function includes a first command which suppresses display of all visual notifications, a second command which suppresses display of selected notifications; a third command which suppresses display of at least one of a plurality of categories of notifications.

30. The system as in claim 23, wherein said visual notifications include icons shown on the television display including one icon for each of the notification types, and only icons for notification types that not suppressed are shown on the television display, and icons for notification types to be suppressed are not shown on the television display.

* * * * *